Feb. 19, 1929.  
E. A. OSIEK  
1,702,362  
MACHINE FOR USE IN MANUFACTURING SHOES  
Filed Dec. 17, 1926  
4 Sheets-Sheet 2
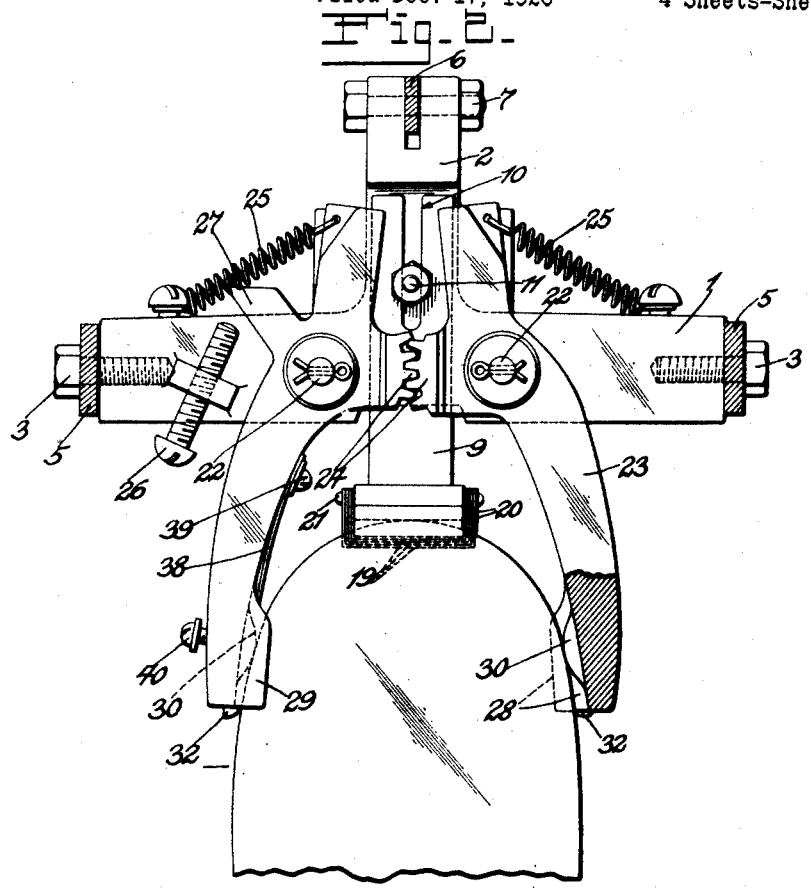
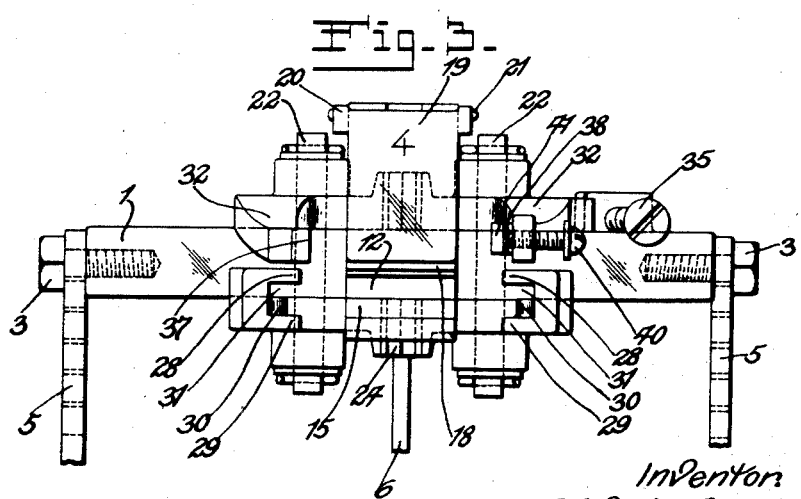
Inventor:  
Edward A. Osiek,  
by Rippey & Kingsland  
His Attorneys.

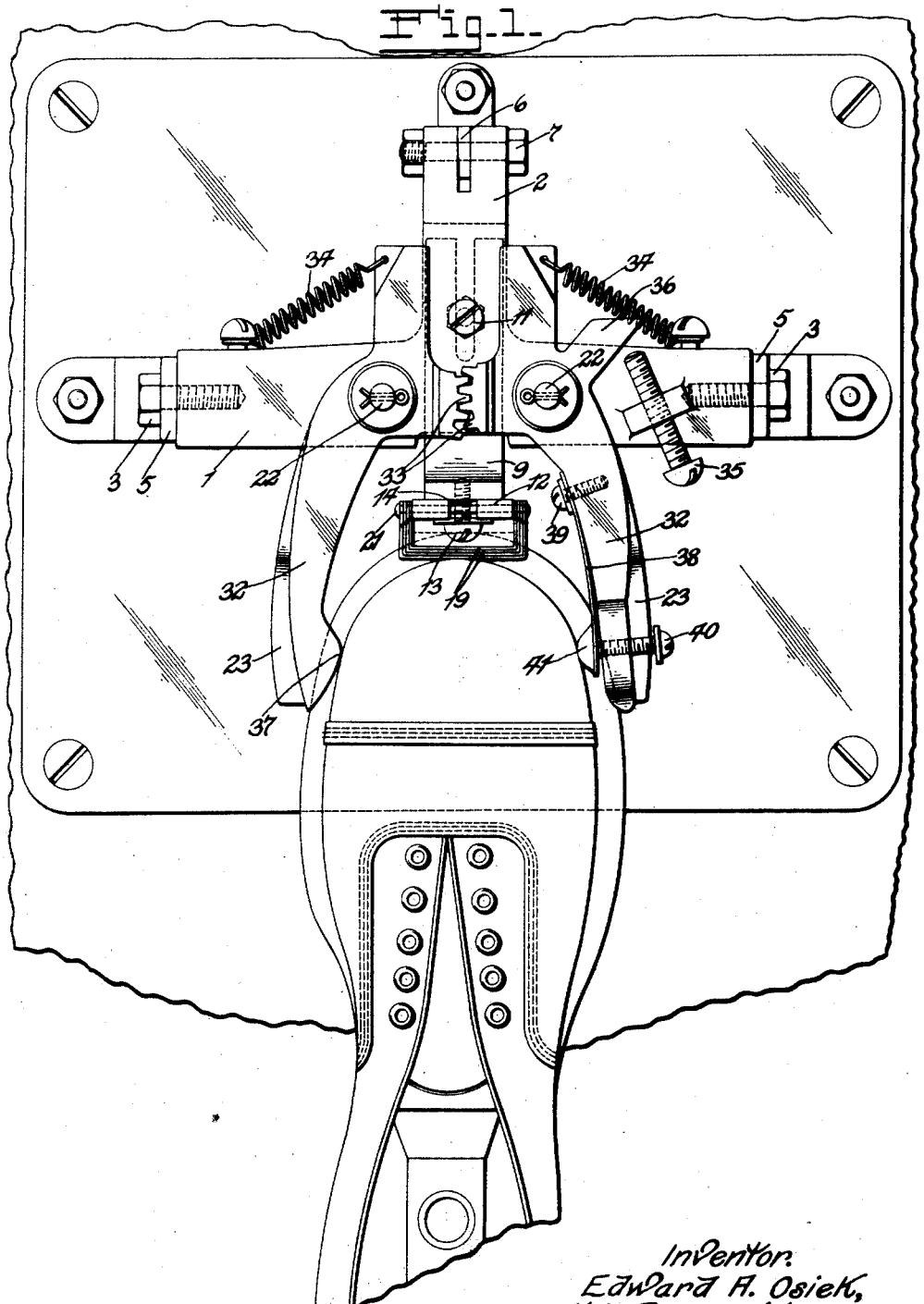

Feb. 19, 1929.
E. A. OSIEK
1,702,362
MACHINE FOR USE IN MANUFACTURING SHOES
Filed Dec. 17, 1926  4 Sheets-Sheet 3
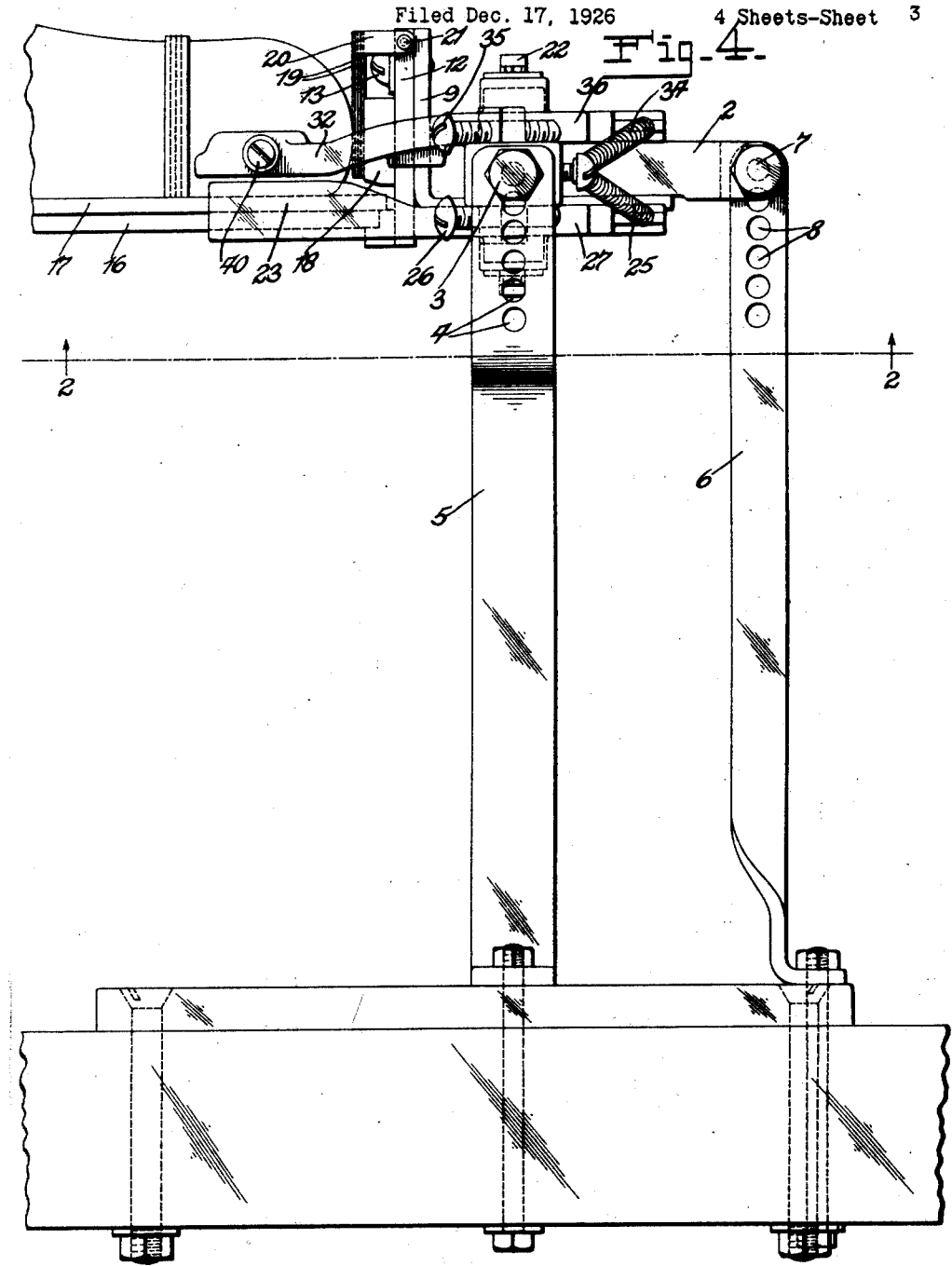
Inventor:
Edward A. Osiek,
by Rippey & Kingsland
His Attorneys.

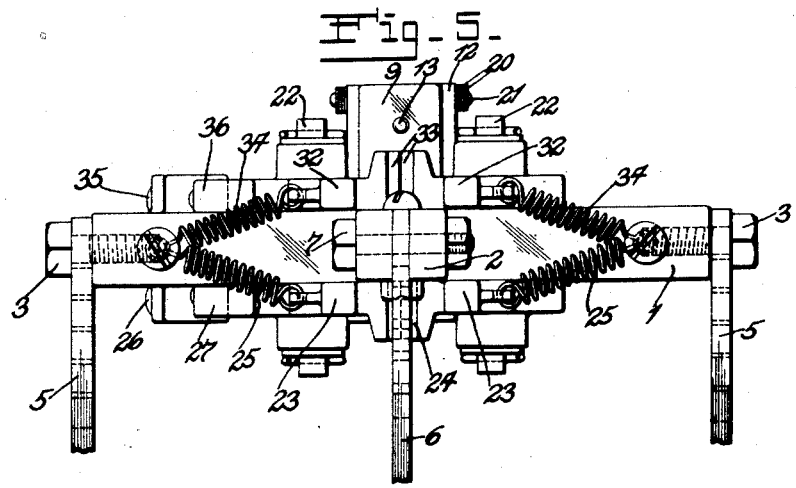

Patented Feb. 19, 1929.

1,702,362

UNITED STATES PATENT OFFICE.

EDWARD A. OSIEK, OF ST. CHARLES, MISSOURI, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR USE IN MANUFACTURING SHOES.

Application filed December 17, 1926. Serial No. 155,362.

This invention relates to machines for use in manufacturing shoes, and is illustrated as embodied in a machine provided with means for use in obtaining proper relative adjustment of the soles and uppers of shoes to facilitate the proper attachment of said parts.

An object of the invention is to provide a machine comprising abutments for the ends and sides of the soles and uppers, respectively, so that when the soles and the uppers of shoes are placed in the machine against the abutments the soles and uppers are properly centered or adjusted relatively for final attachment. In this machine the abutments for each side of the sole and upper are actuated toward the abutments for the opposite side by springs which permit these opposing abutments to be spread apart when the soles and uppers are forced between them to the stationary abutments for the ends.

Another object of the invention is to provide a machine for the use mentioned capable of use in the manufacture of shoes of various sizes, making it unnecessary to provide special machines for the various sizes of shoes.

Other objects of the invention will appear from the following description, reference being made to the drawings, in which Fig. 1 is a top plan view of my improved machine.

Fig. 2 is a bottom plan view, the supports for the machine being in section, on the line 2—2 of Fig. 4, and a part of one of the side abutment jaws being in section.

Fig. 3 is a front elevation.

Fig. 4 is a side elevation.

Fig. 5 is a rear end elevation.

Fig. 6 is a vertical longitudinal sectional view.

Fig. 7 shows the inner faces of the abutment jaws for one side of the sole and upper.

The illustrated machine comprises a strong support which, as shown, includes a transverse part 1 and a rearwardly extending part 2. These two parts are an integral casting and the ends of the part 1 are provided with threaded holes to receive the screws 3 which pass through selected holes 4 in standards 5 whereby the machine may be supported at selected heights. The rear end of the part 2 of the casting is notched to receive the upper end of a standard 6 which is attached to the machine by a bolt 7 passing through the casting and any selected one of the series of holes 8 in the standard. The holes 4 and 8 are in proper relationship so that the machine may be supported horizontally at selected heights or at different angles of inclination as desired, the standard 6 being bendable for proper attachment.

An angular bracket 9 extends under the supporting casting 1—2 (Fig. 6) and has a longitudinal slot 10 through which a clamping bolt 11 passes. This permits forward and rearward adjustment of the bracket 9 which supports abutments for the ends of the soles and uppers of shoes.

A block 12 which supports the abutments is attached to the vertical arm of the bracket 9 by a clamping screw 13 passing through a slot 14 in the block 12 and into a threaded hole in the bracket 9. The slot 14 permits the abutment supporting block 12 to be adjusted vertically, as required for work upon shoes of different sizes and shapes. An abutment block 15 for the ends of soles is attached to the lower end of the block 12 and, as shown, has a notch in its upper front portion to receive the end of the part 16 of a composite shoe sole, while the part 17 of such sole may extend over the block 15. This construction of abutment is also capable of equal satisfactory use on shoes having soles composed of a single piece or on shoes having composite soles with their edges even.

A block 18 is rigid with the block 12 some distance above the sole abutment block 15, leaving a space between said blocks 15 and 18 into which the ends of a shoe sole part may extend.

A number of shoe abutment plates 19 have rearwardly extended ears 20 pivoted upon a pin 21 in connection with the block 12. This permits all of the abutment plates 19 to be used as abutments at the same time, or one or more of them to be swung upwardly and rearwardly out of the way (Fig. 6) to obtain exactly the desired adjustment of the upper upon the shoe sole.

A pair of pivot pins 22 pass through the casting 1 and to the lower ends thereof, below the casting, a pair of arms 23 are pivoted, the same constituting abutments for the side edges of the soles. These arms have intermeshing teeth 24 formed concentrically with the pivots 22 so that each arm is controlled or affected by the other. The rear end of each arm 23 is connected with the casting 1 by a spring 25, the power of which springs is exerted to actuate the front ends of the arms toward each other. The extent of such actuation may be varied as desired by setting an abutment screw 26 in position to be engaged by a projection 27 on one of said arms to limit actuation of said arms by said springs (Fig. 2).

The outer end of each arm 23 is provided on its inner side with an upper flange 28 and a lower flange 29. Above the lower flange 29 a shoulder 30 is provided, the same having a rounded inner face and being spaced from the upper flange 28 to form a groove 31. Thus, in adjusting the parts of shoes having sole members 16 and 17 wherein the edge of the sole member 17 extends beyond the edge of the sole member 16, the groove 31 will receive the extended edge of the sole member 17, while the edge of the sole member 16 rubs and bears against the rounded edge of the shoulder 30. The flanges 28 and 29 function to support the shoe sole, while the upper is mounted on and supported by the sole during the adjustment of said parts of shoes.

A pair of arms 32 for centering the shoe upper on the sole are pivoted on the upper ends of the pins 22 and are of approximately the same length as the arms 23. The arms 32 have intermeshing teeth 33 formed concentrically with the pivot pins 22 so that each arm controls and affects the operation of the other. The forward ends of said arms 32 are actuated toward each other by springs 34 connecting rearward extension of the arms 32 with the supporting member 1. The extent of such actuation may be varied as desired by setting an abutment screw 35 in position to be engaged by a projection 36 on one of said arms 32 to limit the extent of movement of said arms by said springs.

One of the arms 32 is formed with a rounded abutment shoulder 37 designed and arranged to contact with one side of the shoe upper (Fig. 1) to center the same upon the sole. A leaf spring 38 has its inner end attached to the other arm 32 by a screw 39 and its outer end bearing against an adjusting screw 40. The screw 40 is threaded through a hole near the outer end of the arm 32 and is adjustable to vary the position of the end of the spring 38 with respect to the arm 32. Near the outer end of the spring 38 is a rounded abutment 41 opposite the abutment 37 and cooperative therewith to center the shoe upper upon the sole. The purpose of providing the adjustable abutment device 38—41 is to permit the machine to position a sole with a wider margin at one side of the upper than at the other. This may be done by setting the abutment screw 40 to hold the abutment 41 farther or not so far inwardly with respect to the adjacent sole abutment arm 23 than is the rounded shoulder 37.

In using the machine the abutment screw 40 is set in proper position to obtain the desired relative adjustment of the shoe upper upon the sole, and the proper number of abutment plates 19 are left in position in front of the block 18. Then the shoe sole and the upper upon it are forced between the sole adjusting arms 23 and the upper adjusting arms 32, respectively, until the sole contacts with the sole abutment 15 and the upper contacts with its abutment 19. The parts are thereby automatically centered and positioned ready for the attachment of the sole to the upper.

To obtain the desired results the springs 25 are preferably of equal tension and the springs 34 are likewise of equal tension, although there may be variation in the tension of these springs without seriously interfering with the efficiency of the machine, due to the fact that each arm controls the cooperating arm by their intermeshing teeth.

From the foregoing it will be seen that my improved machine greatly facilitates and expedites the operation of positioning a shoe upper upon a sole, irrespective of whether the projecting margins of the sole on both sides of the shoe are the same or not.

It should be understood that, while the illustrated device constitutes a preferred embodiment of the invention, various changes may be made, within the scope of the claims, without departing from the invention.

Having thus described my invention, what I claim as new and desire to secure by Letters Patent is:—

1. A machine for positioning shoe parts comprising abutments for the ends of a shoe sole and shoe upper respectively, a pair of spring actuated arms for engaging the sides of the shoe sole and another pair of spring actuated arms for engaging the shoe upper arranged respectively to position the sole and upper, and a device supported on one of said arms and adjustable thereon to cause different selected relative adjustments of the upper and sole.

2. A machine for positioning shoe parts comprising an abutment for the end of a shoe sole, a series of selectively usable abutments for the corresponding end of an upper whereby selected relative adjustments of the ends of the upper and sole may be obtained as desired, and spring actuated elements for engaging the sides of the shoe sole and the shoe upper to guide said sole and upper toward said abutments respectively.

3. A machine for positioning shoe parts comprising an abutment for the end of a shoe sole, a series of selectively usable abutments for the corresponding end of an upper whereby selected relative adjustments of the ends of the upper and sole may be obtained as desired, spring actuated elements for engaging the sides of the shoe sole and the shoe upper to guide said sole and upper toward said abutments respectively, and means for adjusting one of said guides to obtain different relative adjustments of the sole and upper.

4. A machine for positioning shoe parts comprising abutments for the ends of a shoe sole and shoe upper respectively, spring actuated arms for engaging the sides of the shoe sole, means on said arms for supporting the sole thereby to support the upper, an engaging connection between said arms for controlling one arm by the other, and spring actuated arms for engaging the sides of the shoe upper supported on the sole as aforesaid to center the upper upon the sole.

5. A machine for positioning shoe parts comprising abutments for the ends of a shoe sole and shoe upper respectively, a pair of spring actuated arms for engaging the sides of the shoe sole, means on said arms supporting the sole, an engaging connection between said arms for controlling one arm by the other, another pair of spring actuated arms for engaging the sides of the shoe upper yieldingly to center the upper upon the sole, and engaging connections between said last named arms for controlling each by the other.

6. A machine for positioning shoe parts comprising abutments for the ends of a shoe sole and a shoe upper respectively, a pair of guides for supporting the sole and guiding it to the sole abutment, another pair of guides for guiding the upper to the abutment therefor, and springs tending to urge the guides of each pair toward each other.

7. A machine for positioning shoe parts comprising abutments for the ends of a shoe sole and a shoe upper respectively, a pair of guides for supporting and guiding the sole to the sole abutment, another pair of guides for guiding the upper to the abutment therefor, springs tending to urge the guides of each pair toward each other, and an abutment to limit the extent of movement of said guides by said springs.

8. A machine for positioning shoe parts comprising an abutment for a shoe sole, a pair of pivoted arms for supporting the sole and guiding the end of the sole toward said abutment, an abutment for the shoe upper, a pair of guides for guiding an upper toward the abutment therefor, and means for causing said last named guides to center the upper upon the sole.

9. A machine for positioning shoe parts comprising an abutment for the end of a shoe sole, a pair of pivoted arms for supporting the sole and guiding it toward said abutment, springs tending to urge said arms toward each other, means for operating one of said arms by the other, and another pair of arms for centering a shoe upper upon a sole which is between said arms and against said abutment.

10. A mchine for positioning shoe parts comprising an abutment for the end of a shoe sole, a pair of pivoted arms for supporting the sole and guiding it toward said abutment, springs tending to urge said arms toward each other, means for operating one of said arms by the other, elements for centering a shoe upper upon a sole which is between said arms and against said abutment, and a device limiting extent of movement of one of said arms by said actuating spring therefor.

11. A machine for positioning shoe parts comprising a support, an abutment carried by said support for the end of a shoe sole, a pair of pivoted arms arranged to support the sole and to guide the sole toward said abutment, devices for centering an upper upon a shoe sole supported against said abutment by said arms, and means for supporting the machine at different heights.

12. A machine for positioning shoe parts comprising a support, an abutment carried by said support for the end of a shoe sole, a pair of pivoted arms arranged to support the sole and to guide the sole toward said abutment, devices for centering an upper upon a shoe sole supported against said abutment by said arms, and means for supporting the machine at different angles of inclination.

13. A machine for positioning shoe parts comprising an abutment for a shoe sole, spring actuated elements for guiding a shoe sole and a shoe upper respectively until the shoe sole engages said abutment, means on certain of said elements for supporting the sole thereby to support the upper thereon, and means for supporting said abutment at different distances from the ends of said elements.

14. A machine for positioning shoe parts comprising a support, abutments for the end of a shoe sole and shoe upper respectively, means for securing said abutments in different adjustments upon said support, means for supporting a shoe sole and for guiding the shoe sole toward the abutment therefor, and means for centering the upper upon the shoe sole in contact with the abutment for the upper.

15. A machine for positioning shoe parts comprising a pair of spring actuated arms for engaging the sides of and supporting a shoe sole between said arms, another pair of spring actuated arms for engaging the sides of a shoe upper upon the sole between said first named arms to hold the upper in proper position on the sole, and means for varying the position at which said last named arms will hold the upper upon the sole.

16. A machine for positioning shoe parts comprising a pair of spring actuated arms for engaging the sides of and supporting a shoe sole between said arms, another pair of spring actuated arms for engaging the sides of a shoe upper upon the sole between said first named arms to hold the upper in proper position on the sole, means for varying the position at which said last named arms will hold the upper upon the sole, and selectively usable abutments for the end of the upper upon the sole.

EDWARD A. OSIEK.